United States Patent
Lee

(10) Patent No.: US 9,781,406 B2
(45) Date of Patent: Oct. 3, 2017

(54) APPARATUS FOR GENERATING DEPTH IMAGE

(71) Applicant: LG INNOTEK CO., LTD., Seoul (KR)

(72) Inventor: Jun Seo Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 195 days.

(21) Appl. No.: 14/423,920

(22) PCT Filed: Aug. 28, 2013

(86) PCT No.: PCT/KR2013/007707
§ 371 (c)(1),
(2) Date: Feb. 25, 2015

(87) PCT Pub. No.: WO2014/035127
PCT Pub. Date: Mar. 6, 2014

(65) Prior Publication Data
US 2015/0304631 A1    Oct. 22, 2015

(30) Foreign Application Priority Data
Sep. 3, 2012 (KR) .................. 10-2012-0097101

(51) Int. Cl.
*H04N 13/02* (2006.01)
*H04N 5/265* (2006.01)
(Continued)

(52) U.S. Cl.
CPC ......... *H04N 13/0214* (2013.01); *G06T 7/521* (2017.01); *G06T 7/593* (2017.01);
(Continued)

(58) Field of Classification Search
CPC ................ G06T 7/0075; G06T 7/0057; G06T 2207/10012; G06T 2207/10048;
(Continued)

(56) References Cited

U.S. PATENT DOCUMENTS

2010/0097495 A1*  4/2010  Choe .................. G06T 5/50
                                                348/235
2010/0128129 A1    5/2010  Kim
(Continued)

FOREIGN PATENT DOCUMENTS

KR    10-2012-0080939 A    7/2012
KR    10-2012-0084216 A    7/2012
KR    10-2012-0091970 A    8/2012

OTHER PUBLICATIONS

Office Action dated Apr. 19, 2016 in Chinese Application No. 201380046006.6.
(Continued)

*Primary Examiner* — Mohammed Rahaman
*Assistant Examiner* — Richard Carter
(74) *Attorney, Agent, or Firm* — Saliwanchik, Lloyd & Eisenschenk

(57) ABSTRACT

An apparatus for generating depth image is provided, the apparatus according to an exemplary embodiment of the present disclosure being configured to perform an accurate stereo matching even in a low light level by obtaining RGB images and/or IR images, and using the obtained RGB images and/or IR images to extraction of a depth image.

12 Claims, 2 Drawing Sheets

(51) Int. Cl.
*G06T 7/521* (2017.01)
*G06T 7/593* (2017.01)
*H04N 13/00* (2006.01)

(52) U.S. Cl.
CPC ......... *H04N 5/265* (2013.01); *H04N 13/0239* (2013.01); *H04N 13/0253* (2013.01); *H04N 13/0271* (2013.01); *H04N 13/0296* (2013.01); *G06T 2207/10012* (2013.01); *G06T 2207/10048* (2013.01); *G06T 2207/10152* (2013.01); *H04N 2013/0081* (2013.01)

(58) Field of Classification Search
CPC ...... G06T 2207/10152; H04N 13/0239; H04N 13/0253; H04N 13/0271; H04N 13/0296; H04N 13/0214; H04N 5/265; H04N 2013/0081
USPC ............................................. 348/46, 47, 235
See application file for complete search history.

(56) References Cited

U.S. PATENT DOCUMENTS

| | | | |
|---|---|---|---|
| 2011/0175983 A1* | 7/2011 | Park | G03B 35/08 348/46 |
| 2012/0050491 A1 | 3/2012 | Seshadri et al. | |
| 2012/0182394 A1* | 7/2012 | Bae | H04N 13/0011 348/46 |
| 2013/0107010 A1* | 5/2013 | Hoiem | G06T 7/0081 348/47 |
| 2015/0222881 A1* | 8/2015 | Lee | H04N 13/0239 348/47 |

OTHER PUBLICATIONS

International Search Report in International Application No. PCT/KR2013/007707, filed Aug. 28, 2013.

* cited by examiner

[Fig. 1]
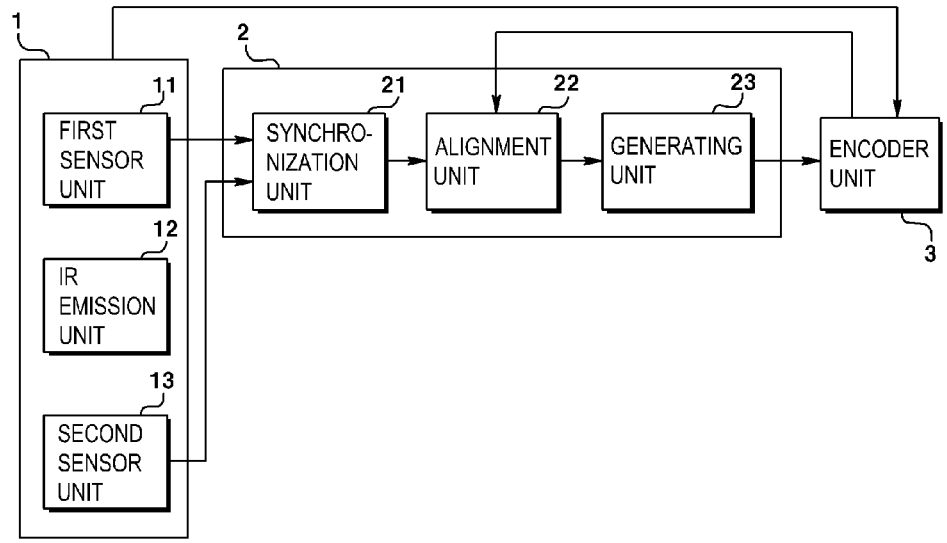
[Fig. 2]
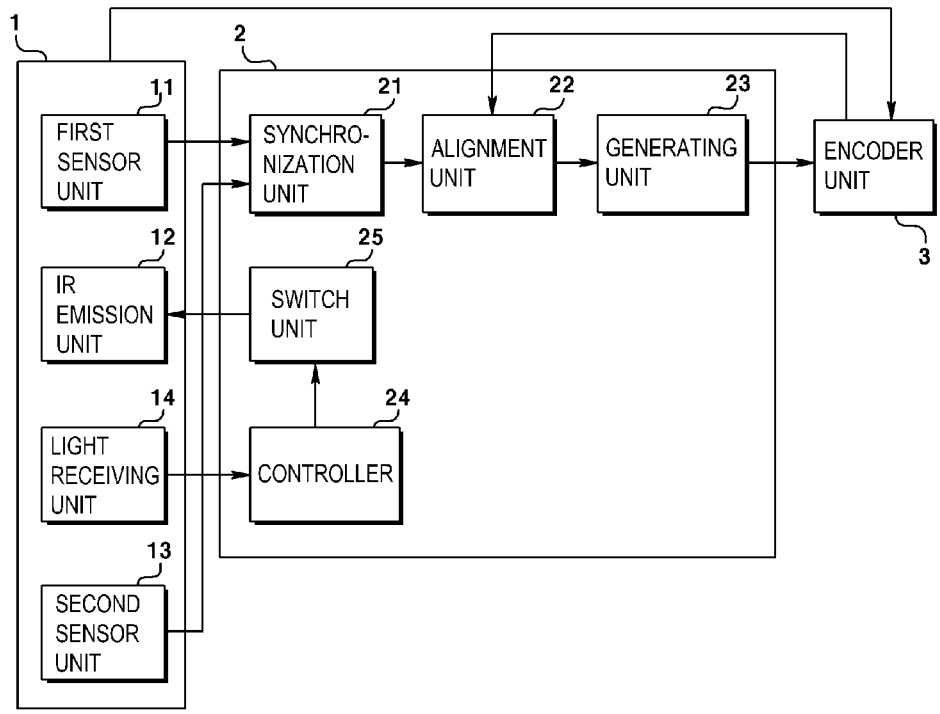

[Fig. 3]
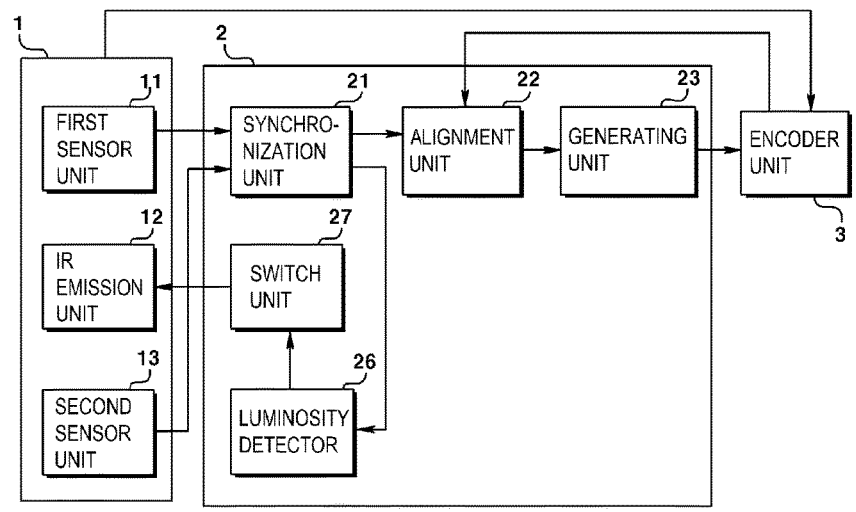

APPARATUS FOR GENERATING DEPTH IMAGE

CROSS-REFERENCE TO RELATED APPLICATIONS

This application is the U.S. national stage application of International Patent Application No. PCT/KR2013/007707, filed Aug. 28, 2013, which claims priority to Korean Application No. 10-2012-0097101, filed Sep. 3, 2012, the disclosures of each of which are incorporated herein by reference in their entirety.

TECHNICAL FIELD

Exemplary aspects of the present disclosure relate to an apparatus for generating depth image.

BACKGROUND ART

As is well known, human vision is one of senses for obtaining information of surrounding environments, and can recognize a position of an object, and farness and closeness through two eyes. That is, visionary information inputted through two eyes is synthesized to one distance information to allow a human to freely activate. A stereo camera system may be the one used to realize a visionary structure into a machine.

The stereo camera system performs a stereo matching relative to an image obtained by using two cameras, where the stereo camera system obtains a depth image using binocular disparity of two cameras in the stereo matching process. Depth image data is used for recognition.

Meantime, it is difficult for a stereo camera to recognize an image under a low light level, thereby creating a problem in obtaining a depth image.

DISCLOSURE OF INVENTION

Technical Problem

Exemplary aspects of the present disclosure are to substantially solve at least the above problems and/or disadvantages and to provide at least the advantages as mentioned below. Thus, the present disclosure is directed to provide an apparatus for generating a depth image configured to generate a depth image by obtaining an IR (Infrared) image under a low light level.

Solution to Problem

In one general aspect of the present disclosure, there may be provided an apparatus for generating a depth image, the apparatus comprising: a camera unit configured to output left and right RGB (Red-Green-Blue) images and left and right IR (Infrared) images; and a first generating unit configured to generate a depth image from the IR images received from the camera unit.

In some exemplary of the present invention, the camera unit may comprise: a first sensor unit configured to obtain the left RGB image and the left IR image, a second sensor unit configured to obtain the right RGB image and the right IR image, and at least one emission unit configured to emit an IR.

In some exemplary of the present invention, the emission unit may comprise a single IR device or plural IR devices.

In some exemplary of the present invention, the IR device may include any one of an LD (Laser Diode) and an LED (Light Emitting Diode).

In some exemplary of the present invention, the camera unit may further comprise a splitter arranged at a front end of the emission unit to disperse the IR emitted from the emission unit in a predetermined pattern.

In some exemplary of the present invention, the first generating unit comprises: a synchronization unit configured to synchronize the left and right IR images among outputs of the first and second sensor units, and a second generating unit configured to generate the depth image from the left and right IR images received from the synchronization unit.

In another general aspect of the present disclosure, there may be provided an apparatus for generating a depth image, the apparatus comprising: a camera unit configured to obtain any one of left and right RGB images, left and right RGB and IR images (RGB/IR images) and left and right IR images; and a first generating unit configured to: control the camera unit to obtain any one of left and right RGB images, the left and right RGB/IR images and the left and right IR images, and generate a depth image from the left and right RGB images or the left and right IR images received from the camera unit.

In some exemplary of the present invention, the camera unit may comprises: a first sensor unit configured to obtain any one of the left RGB image, the left RGB/IR image and the left IR image, a second sensor unit configured to obtain any one of the right RGB image, the right RGB/IR image and the right IR image, a light receiving unit configured to detect an intensity of illumination, and at least one emission unit configured to emit an IR by being turned on or off in response to control of the first generating unit.

In some exemplary of the present invention, the emission unit may comprise a single IR device or plural IR devices.

In some exemplary of the present invention, the IR device may include any one of an LD and an LED.

In some exemplary of the present invention, the camera unit may further comprise a splitter arranged at a front end of the emission unit to disperse the IR emitted from the emission unit in a predetermined pattern.

In some exemplary of the present invention, the first generating unit may comprise: a controller configured to control ON and OFF of the emission unit in response to an intensity of light detected by the light receiving unit, a synchronization unit configured to synchronize the left and right IR images from outputs of the first and second sensor units, and a second generating unit configured to generate the depth image from the left and right IR images received from the synchronization unit.

In some exemplary of the present invention, the first generating unit may further comprises: a switching unit configured to switch on or switch off the emission unit in response to control of the controller.

In some exemplary of the present invention, the controller may be configured to change the emission unit to an ON state when the intensity of light detected by the light receiving unit is below a predetermined intensity of illumination.

In another general aspect of the present disclosure, there may be provided an apparatus for generating a depth image, the apparatus comprising: a camera unit configured to obtain left and right RGB images, or left and right RGB and IR images (RGB/IR images); and a first generating unit configured to control the camera unit to obtain an RGB image or RGB/IR images, and generate a depth image from the left/right RGB images or IR image received from the camera unit.

In some exemplary of the present invention, the camera unit may comprise: a first sensor unit configured to obtain the left RGB image or the left RGB/IR image, a second sensor unit configured to obtain the right RGB image or the right RGB/IR images, and at least one emission unit configured to emit an IR by being turned on or off in response to control of the first generating unit.

In some exemplary of the present invention, the emission unit may comprise a single IR device or plural IR devices.

In some exemplary of the present invention, the IR device may include any one of an LD and an LED.

In some exemplary of the present invention, the camera unit may further comprise: a splitter arranged at a front end of the emission unit to disperse the IR emitted from the emission unit in a predetermined pattern.

In some exemplary of the present invention, the first generating unit may comprise: a synchronization unit configured to synchronize outputs of the first and second sensor units, a second generating unit configured to generate the depth image from the left and right IR images received from the synchronization unit, and a controller configured to turn on or off the emission unit in response to an average brightness of pixel of the left and right RGB images received from the synchronization unit.

In some exemplary of the present invention, the first generating unit may further comprise: a switching unit configured to switch on or switch off the emission unit in response to control of the controller.

In some exemplary of the present invention, the controller may be configured to turn on the emission unit when an average of pixel of the RGB image is less than a threshold.

Advantageous Effects of Invention

The apparatus for generating a depth image according to an exemplary embodiment of the present disclosure has an advantageous effect in that an accurate depth image can be generated even under a low light level by simultaneously obtaining an RGB image and an IR image through emission of IR to a target.

The apparatus for generating a depth image according to an exemplary embodiment of the present disclosure has another advantageous effect in that the apparatus detects a low light level while performing a general operation under a normal light level, to obtain an RGB image and an IR image, or only the IR image, whereby an accurate depth image can be generated using the IR image.

BRIEF DESCRIPTION OF DRAWINGS

FIG. 1 is a block diagram illustrating an apparatus for generating a depth image according to a first exemplary embodiment of the present disclosure.

FIG. 2 is a block diagram illustrating an apparatus for generating a depth image according to a second exemplary embodiment of the present disclosure.

FIG. 3 is a block diagram illustrating an apparatus for generating a depth image according to a third exemplary embodiment of the present disclosure.

BEST MODE FOR CARRYING OUT THE INVENTION

Advantages and features of the present disclosure may be understood more readily by reference to the following detailed description of exemplary embodiments and the accompanying drawings. Thus, the present disclosure is not limited to the exemplary embodiments which will be described below, but may be implemented in other forms. Accordingly, the described aspect is intended to embrace all such alterations, modifications, and variations that fall within the scope and novel idea of the present disclosure.

Now, exemplary embodiments of the present disclosure will be described in detail with reference to the accompanying drawings.

FIG. 1 is a block diagram illustrating an apparatus for generating a depth image according to a first exemplary embodiment of the present disclosure.

Referring to FIG. 1, the depth image according to a first exemplary embodiment of the present disclosure may comprise a camera unit (1) and a depth image generating unit (2), where the depth image generated by the depth image generating unit (2) may be provided to an encoder unit (3). The encoder unit (3) serves to encode a stereo image received in H.264, for example, a detailed explanation of which will be omitted hereinafter, because the technique related to image encoding is well known to the skilled in the art, which is also applicable to other ensuing exemplary embodiments of the present disclosure.

Although the exemplary embodiment of the present disclosure has explained and illustrated that the camera unit (1), the depth image generating unit (2) and the encoder unit (3) are formed in separate hardware configuration, the present disclosure is not limited thereto, and thus, the camera unit (1), the depth image generating unit (2) and the encoder unit (3) may be formed in separate chips within same hardware (e.g., camera, etc.) or may be formed in one chip.

The camera unit (1) according to the exemplary embodiment of the present disclosure comprises a first sensor unit (11), an IR (Infrared) emission unit (12) and a second sensor unit (13), and obtains RGB (Red-Green-Blue) images and an IR image relative to a target. It should be apparent that components of the camera unit (1) according to the exemplary embodiment of the present disclosure are not limited to the alignment illustrated in the drawing.

The first and second sensor units (11 and 13) may be CCD (Charged Coupled Device) sensors or CMOS (Complementary Metal-Oxide Semiconductor) sensors, for example, and obtain left and right RGB images and IR images respectively. However, it should be apparent to the skilled in the art that the first and second sensor units (11 and 13) are not limited to the CCD sensors or the CMOS sensors, and any other devices capable of performing similar functions thereto may be used for the first and second sensor units (11 and 13).

In the exemplary embodiment of the present disclosure, explanation will be provided hereinafter for a case where an image obtained by the first sensor unit (11) is a left image and an image obtained by the second sensor unit (13) is a right image, for convenience sake. However, the present disclosure is not limited thereto.

The IR emission unit (12) may comprise a single IR device or plural IR devices, and emit an IR to a target. Although the IR emission device (12) includes an IR device such as an LD (Laser Diode) or an LED (Light Emitting Diode) in the exemplary embodiment of the present disclosure, the IR device is not limited thereto, and it should be apparent that application of IR devices capable of emitting an IR to a target is not ruled out.

Although the exemplary embodiment of the present disclosure has explained and illustrated one IR emission unit (12), the present disclosure is not limited thereto. That is, as the number of IR emission units (12) is increased, an output is also increased, which means that the increased number of IR emission units (12) can bring forth an increased IR recognition range capable of recognizing under a low light level and also to a remote distance, such that the number of IR emission units (12) may be determined in accordance with adequate recognition distance.

Meanwhile, the IR emission unit (12) including an LD has a straightness, the depth image according to a first exemplary embodiment of the present disclosure may further comprise a splitter arranged at a front end of the IR emission unit (12) to disperse the IR emitted from the IR emission unit (12) in a predetermined pattern. The first and second sensor units (11 and 13) according to the first exemplary embodiment of the present disclosure may simultaneously obtain the RGB images and the IR images by the IR emitted from the IR emission unit (12).

The depth image generating unit (2) of FIG. 1 may comprise a synchronization unit (21), an alignment unit (22) and a generating unit (23).

The synchronization unit (21) may receive left and right IR images from the first and second sensor units (11 and 13). The synchronization unit (21) may perform the synchronization of the received left and right IR images. The term of synchronization in the exemplary embodiment of the present disclosure means an equal alignment of time in which the images are received. That is, the synchronization unit (21) performs the alignment in which the left and right images are received in the substantially same time.

The alignment unit (22) performs a calibration so that the inputted left and right IR images are aligned. In the alignment process by the alignment unit (22), the encoder unit (3) may receive a calibration data from the first and second sensor units (11 and 13) of the camera unit (1), convert the calibration data to an alignment parameter and transmit to the alignment unit (22). The alignment unit (22) may perform the calibration relative to the image in which the synchronization received from the synchronization unit (21) is performed, using the alignment parameter received from the encoder unit (3).

The generating unit (23) may generate a depth image from the aligned left and right images. The method for generating the depth image by the generating unit (23) may comprise a stereo matching method, but the present disclosure is not limited thereto and other various depth image generating methods may be utilized. The operations of the alignment unit (22) and the generating unit (23) are well known to the skilled in the art and therefore detailed explanation thereto is omitted.

Now, operation of the apparatus for generating the depth image according to the first exemplary embodiment of the present disclosure will be described.

In the apparatus for generating the depth image according to the first exemplary embodiment of the present disclosure, the IR emission unit (12) is always in an ON state, and emits an IR to a target, while the first and second sensor units (11 and 13) obtain the RGB images and IR images respectively.

Thereafter, the synchronization unit (21) may perform the synchronization on the left and right IR images and transmit the synchronization-performed left and right IR images to the alignment unit (22). The alignment unit (22) may align the left and right images and the generating unit (23) may generate a depth image based on the left and right images.

Hence, according to the first exemplary embodiment of the present disclosure, the IR emission unit (12) may emit the IR, the first and second sensor units (11 and 13) may obtain the RGB images and the IR images and generate the depth image from the IR images out of the RGB images and the IR images, and extract an accurate depth image under a low light level.

MODE FOR THE INVENTION

FIG. 2 is a block diagram illustrating an apparatus for generating a depth image according to a second exemplary embodiment of the present disclosure.

Referring to FIG. 2, the apparatus for generating a depth image according to the second exemplary embodiment of the present disclosure may comprise a camera unit (1) and a depth image generating unit (2), where the depth image generated by the depth image generating unit (2) may be provided to an encoder unit (3).

The camera unit (1) according to the second exemplary embodiment of the present disclosure may comprise a first sensor unit (11), an IR emission unit (12), a light receiving unit (14) and a second sensor unit (13), where the depth image generating unit (2) may comprise a synchronization unit (21), an alignment unit (22), a generating unit (23), a controller (24) and a switch unit (25).

The second exemplary embodiment of the present disclosure is different from the first embodiment of the present disclosure in terms of structure in that the second embodiment comprise the light receiving unit (14) of the camera unit (1), the controller (24) and the switch unit (25) of the depth image generating unit (2), and therefore, explanation will be focused on the difference from the first embodiment.

The first and second sensor units (11 and 13) of the camera unit (1) respectively obtain the left and right RGB images or RGB images and IR images. The IR emission unit (12) is in an OFF state under a normal intensity of illumination, and is changed to an ON state by control of the controller (24), in a case the intensity of illumination of the light receiving unit (14) is detected to have a light level less than a predetermined intensity of illumination, the details of which will be described later.

The light receiving unit (14) may receive light of an area arranged with the camera unit (1), and transmit an intensity of light (illumination) to the controller (24) of the depth image generating unit (2). The light receiving unit (14) may include a photo sensor or an luminance sensor, but the present disclosure is not limited thereto.

The controller (24) of depth image generating unit (2) may receive the intensity of light from the light receiving unit (14) and control the switch unit (22) to turn on the IR emission unit (12) when the received intensity of light is less than a predetermined light level and to turn off the IR emission unit (12) when the received intensity of light is more than a predetermined light level. The switch unit (22) may switch the ON and OFF of the IR emission unit (12) in response to the control of the controller (24).

The synchronization unit (21) according to the second exemplary embodiment of the present disclosure may receive the RGB images from the first and second sensor units (11 and 13) in case of normal intensity of light, receive the RGB images and IR images or receive only the IR images in case of being less than the predetermined light level.

Now, operation of the apparatus for generating the depth image according to the second exemplary embodiment of the present disclosure will be described.

In case of normal intensity of light, i.e., in case of the intensity of light detected by the light receiving unit (14) being within a normal light level, the apparatus for generating the depth image according to the second exemplary embodiment of the present disclosure operates in such a manner that synchronization to the RGB images obtained by the first and second sensor units (11 and 13) is performed by the synchronization unit (21), the alignment unit (22) aligns the left and right images, and the generating unit (23) generates the depth image based on the aligned left and right images.

However, the controller (24) controls the switch unit (25) to change the IR emission unit (12) to an ON state, in a case the intensity of light detected by the light receiving unit (14) is less than a predetermined light level.

In a case the IR emission unit (12) is changed to the ON state to emit an IR to a target, the first and second sensor units (11 and 13) may respectively obtain the RGB images and IR images, or IR images only. The images provided to the synchronization unit (21) are IR images among the obtained RGB images and IR images, or IR images.

Thereafter, the synchronization unit (21) may perform the synchronization on the inputted left and right IR images, and the alignment unit (22) may align the left and right images, whereby the generating unit (23) can generate the depth image.

According to the second exemplary embodiment of the present disclosure, the apparatus can detect a low light level while performing a general operation under a normal light level, obtain RGB images and IR images, or only the IR images, whereby an accurate depth image can be generated using the IR images.

FIG. 3 is a block diagram illustrating an apparatus for generating a depth image according to a third exemplary embodiment of the present disclosure.

Referring to FIG. 3, the apparatus for generating a depth image according to the third exemplary embodiment of the present disclosure may comprise a camera unit (1) and a depth image generating unit (2), where the depth image generated by the depth image generating unit (2) may be provided to an encoder unit (3).

The camera unit (1) according to the third exemplary embodiment of the present disclosure may include a first sensor unit (11), an IR emission unit (12), and a second sensor unit (13), where the depth image generating unit (2) may include a synchronization unit (21), an alignment unit (22), a generating unit (23), a luminosity detector (26) and a switch unit (27).

The third exemplary embodiment of the present disclosure is different from the first embodiment of the present disclosure in terms of configuration in that the third embodiment includes the luminosity detector (26) and the switch unit (27) of the depth image generating unit (2), and therefore, explanation will be focused on the difference from the first embodiment.

The first and second sensor units (11 and 13) of the camera unit (1) respectively obtain the left/right RGB images and/or IR images. The IR emission unit (12) is in an OFF state under a normal intensity of illumination, and is changed to an ON state by switching of the switch unit (27), in a case the intensity of illumination of the luminosity detector (26) is detected to have a light level less than a predetermined intensity of illumination.

The luminosity detector (24) of depth image generating unit (2) may receive the RGB images synchronized by the synchronization unit (21) to monitor an average of pixel values of the images, and determine that the light is in the low light level, in a case the average of pixels is less than a threshold, where the switch unit (27) may change the IR emission unit (12) to an ON state.

The switch unit (27) may switch the ON and OFF of the IR emission unit (12) in response to the control of the luminosity detector (26).

The synchronization unit (21) according to the third exemplary embodiment of the present disclosure may receive the RGB images from the first and second sensor units (11 and 13) in case of normal intensity of light, receive the RGB images and IR images in case of being less than the predetermined light level. In the third exemplary embodiment of the present disclosure, the luminosity detector (26) detects the average of intensity of luminance using the pixels of the RGB images, whereby the RGB images can be received regardless of luminance.

Now, operation of the apparatus for generating the depth image according to the third exemplary embodiment of the present disclosure will be described.

In case of normal intensity of light, i.e., in a case the luminosity detector (26) determines that the light is in a normal intensity of light from the average value of pixels in RGB images, the apparatus for generating the depth image according to the third exemplary embodiment of the present disclosure operates in such a manner that synchronization to the RGB images obtained by the first and second sensor units (11 and 13) is performed by the synchronization unit (21), the alignment unit (22) aligns the left and right images, and the generating unit (23) generates the depth image based on the aligned left and right images. At this time, the IR emission unit (12) is in an OFF state.

However, the luminosity detector (26) controls the switch unit (27) to change the IR emission unit (12) to an ON state, in a case it is determined that the average value of the pixels of RBG images is less than a threshold.

In a case the IR emission unit (12) is changed to the ON state to emit an IR to a target, the first and second sensor units (11, 13) may respectively obtain the RGB images and IR images.

Thereafter, the synchronization unit (21) may perform the synchronization on the left and right RGB and IR images, and the alignment unit (22) may align the IR images, whereby the generating unit (23) can generate the depth image.

According to the third exemplary embodiment of the present disclosure, the apparatus can detect a low light level while performing a general operation under a normal light level, obtain RGB images and IR images, whereby an accurate depth image can be generated using the IR images.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

The invention claimed is:

1. An apparatus for generating a depth image, the apparatus comprising:
    a camera unit configured to obtain any one of left and right RGB images, left and right RGB and IR images (RGB/IR images) and left and right IR images; and
    a first generating unit configured to:
    control the camera unit to obtain any one of left and right RGB images, the left and right RGB/IR images, and the left and right IR images, and generate a depth image from the left and right RGB images or the left and right IR images received from the camera unit;

wherein the camera unit comprises:

a first sensor unit configured to obtain any one of the left RGB image, the left RGB/IR image, and the left IR image;

a second sensor unit configured to obtain any one of the right RGB image, the right RGB/IR image, and the right IR image;

a light receiving unit configured to detect an intensity of illumination;

at least one emission unit configured to emit an IR by being turned on or off in response to control of the first generating unit; and a splitter configured to disperse the IR emitted from the emission unit in a predetermined pattern;

wherein the first generating unit comprises:

a controller configured to control ON and OFF of the emission unit in response to an intensity of light detected by the light receiving unit;

a synchronization unit configured to synchronize the left and right IR images from outputs of the first and second sensor units; and a second generating unit configured to generate the depth image from the left and right IR images received from the synchronization unit.

2. The apparatus of claim 1, wherein the emission unit comprises a single IR device or plural IR devices.

3. The apparatus of claim 2, wherein the IR device includes any one of an LD and an LED.

4. The apparatus of claim 1, wherein the
splitter is arranged at a front end of the emission unit.

5. The apparatus of claim 1, wherein the first generating unit further comprises:
a switching unit configured to switch on or switch off the emission unit in response to control of the controller.

6. The apparatus of claim 1, wherein the controller is configured to change the emission unit to an ON state when the intensity of light detected by the light receiving unit is below a predetermined intensity of illumination.

7. An apparatus for generating a depth image, the apparatus comprising:

a camera unit configured to obtain left and right RGB images, or left and right RGB and IR images (RGB/IR images); and a first generating unit configured to:
control the camera unit to obtain an RGB image or RGB/IR images, and
generate a depth image from the left/right RGB images or IR image received from the camera unit;

wherein the camera unit comprises:

at least one emission unit configured to emit an IR by being turned on or off in response to control of the first generating unit; and a splitter configured to disperse the IR emitted from the emission unit in a predetermined pattern; and wherein the first generating unit comprises:

a synchronization unit configured to synchronize outputs of first and second sensor units;

a second generating unit configured to generate the depth image from the left and right IR images received from the synchronization unit;

a controller configured to turn on or off the emission unit in response to an average brightness of pixel of the left and right RGB images received from the synchronization unit; and a switching unit configured to switch on or switch off the emission unit in response to control of the controller.

8. The apparatus of claim 7, wherein:
the first sensor unit is configured to obtain the left RGB image or the left RGB/IR image, and
the second sensor unit is configured to obtain the right RGB image or the right RGB/IR images.

9. The apparatus of claim 8, wherein the emission unit comprises a single IR device or plural IR devices.

10. The apparatus of claim 9, wherein the IR device includes any one of an LD and an LED.

11. The apparatus of claim 8, wherein the camera unit further comprises:
a splitter arranged at a front end of the emission unit to disperse the IR emitted from the emission unit in a predetermined pattern.

12. The apparatus of claim 7, wherein the controller is configured to turn on the emission unit when an average of pixel of the RGB image is less than a threshold.

* * * * *